(12) United States Patent
Sites

(10) Patent No.: US 6,324,555 B1
(45) Date of Patent: Nov. 27, 2001

(54) COMPARING CONTENTS OF ELECTRONIC DOCUMENTS

(75) Inventor: Richard Lee Sites, Menlo Park, CA (US)

(73) Assignee: Adobe Systems Incorporated, San Jose, CA (US)

(*) Notice: Subject to any disclaimer, the term of this patent is extended or adjusted under 35 U.S.C. 154(b) by 0 days.

(21) Appl. No.: 09/143,992

(22) Filed: Aug. 31, 1998

(51) Int. Cl.$^7$ ................................................ G06F 17/21
(52) U.S. Cl. .................................... 707/517; 707/511
(58) Field of Search ........................... 707/517, 5, 525, 707/103, 4, 6, 511; 709/203, 218; 380/51

(56) References Cited

U.S. PATENT DOCUMENTS

| | | | |
|---|---|---|---|
| 5,465,353 | * | 11/1995 | Hull et al. .............................. 707/5 |
| 5,699,453 | * | 12/1997 | Ozaki .................................. 382/176 |
| 5,701,469 | * | 12/1997 | Brandli et al. ...................... 707/102 |
| 5,778,361 | * | 7/1998 | Nanjo et al. ............................ 707/5 |
| 5,835,638 | * | 11/1998 | Rucklidgw et al. ................ 382/257 |
| 5,890,177 | * | 3/1999 | Moody et al. ....................... 707/511 |
| 5,893,908 | * | 4/1999 | Cullen et al. ........................... 707/5 |
| 5,898,836 | * | 4/1999 | Freivald et al. ..................... 709/218 |
| 5,912,974 | * | 6/1999 | Holloway et al. .................... 380/51 |
| 5,941,944 | * | 8/1999 | Messerly ............................. 709/203 |
| 5,953,451 | * | 9/1999 | Syeda-Mahmood ................ 382/187 |
| 5,978,842 | * | 11/1999 | Noble et al. ........................ 709/218 |
| 5,991,466 | * | 11/1999 | Ushiro et al. ....................... 382/305 |
| 5,999,664 | * | 12/1999 | Mahoney et al. ................... 382/305 |
| 6,018,749 | * | 1/2000 | Rivette et al. ...................... 707/525 |
| 6,029,175 | * | 2/2000 | Chow et al. ........................ 707/104 |
| 6,119,124 | * | 2/2000 | Broder et al. ...................... 707/103 |

OTHER PUBLICATIONS

Simpson, Mastering WordPerfect 5.1 & 5.2 for Windows, Ch. 2 (pp. 26–53), 1993.*

* cited by examiner

Primary Examiner—Stephen S. Hong
(74) Attorney, Agent, or Firm—Fish & Richardson P.C.

(57) ABSTRACT

A method is described which compares contents-rich documents page by page and creates a difference document of paired pages. The pages are compared, in that order, based on their marking operators, on bitmaps rendered from the still unpaired pages, and on a subset of the bitmap, e.g. in smaller page areas. Pages that are visually identical are paired. Blank pages are inserted if pages cannot be paired to deal with page insertions and deletions. Differences between pages which can be visible in a printed document, are marked on the paired pages. The method can be used with documents that contain embedded graphical contents as well as with plain text files.

5 Claims, 12 Drawing Sheets

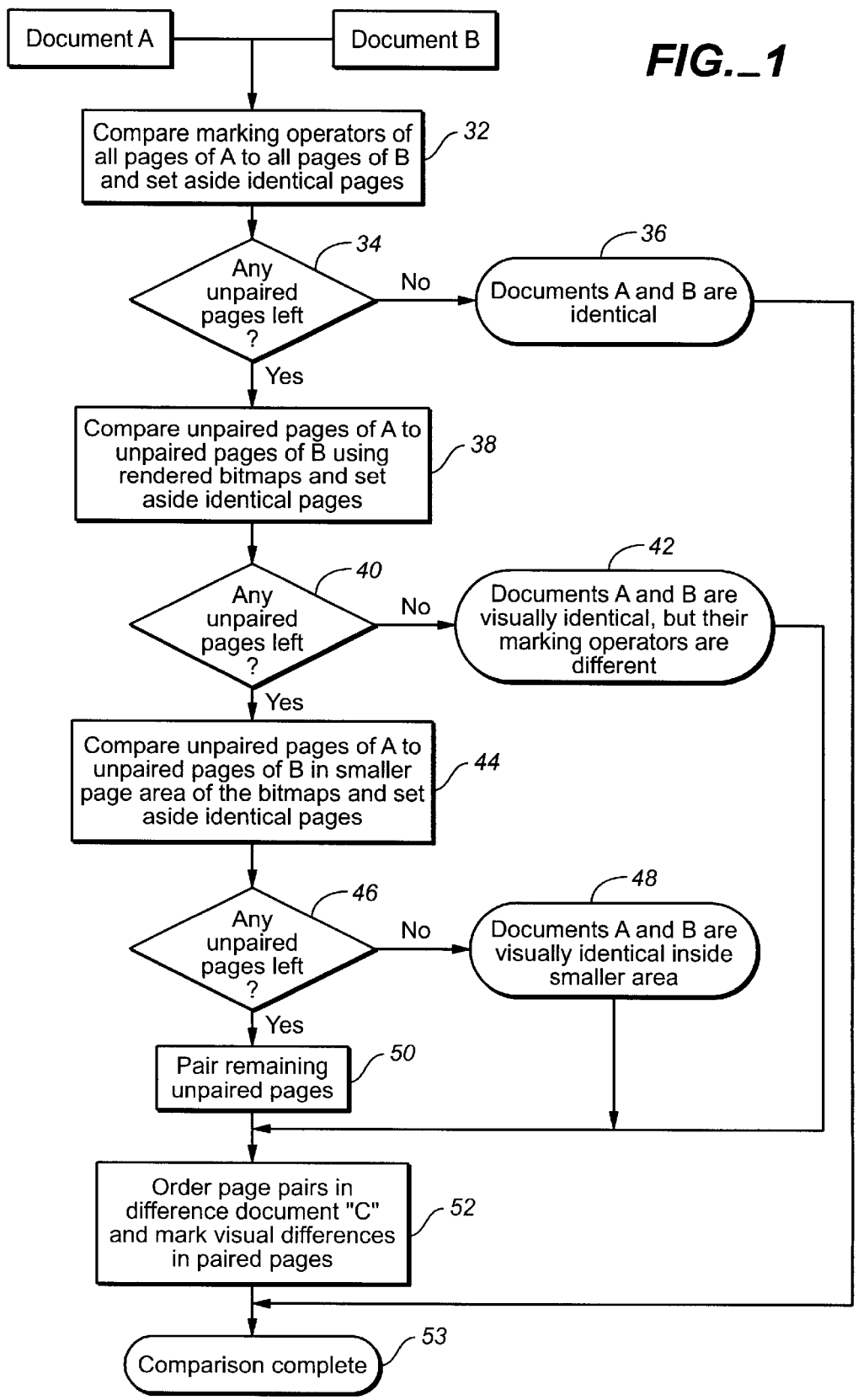
FIG._1

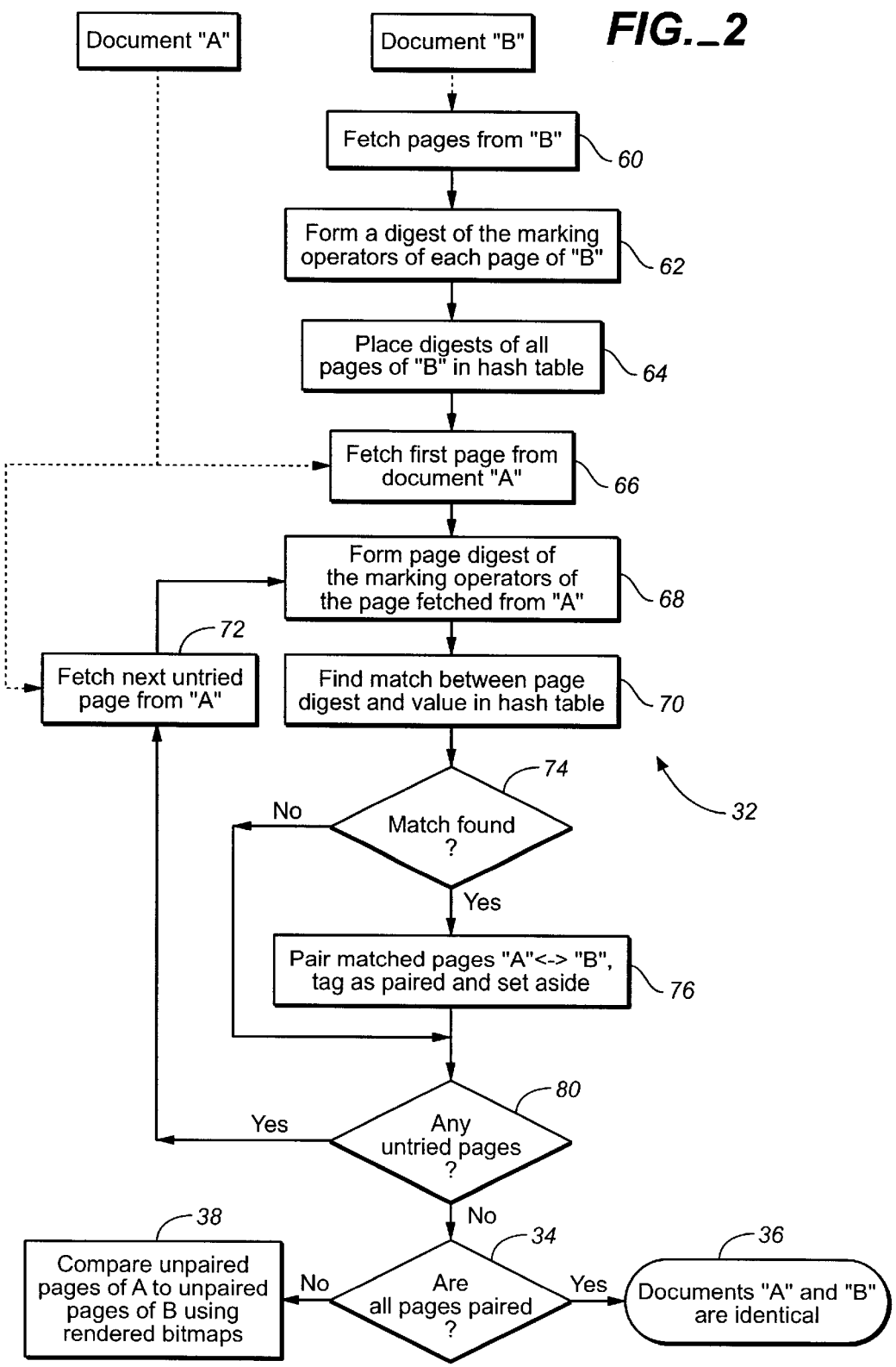
FIG._2

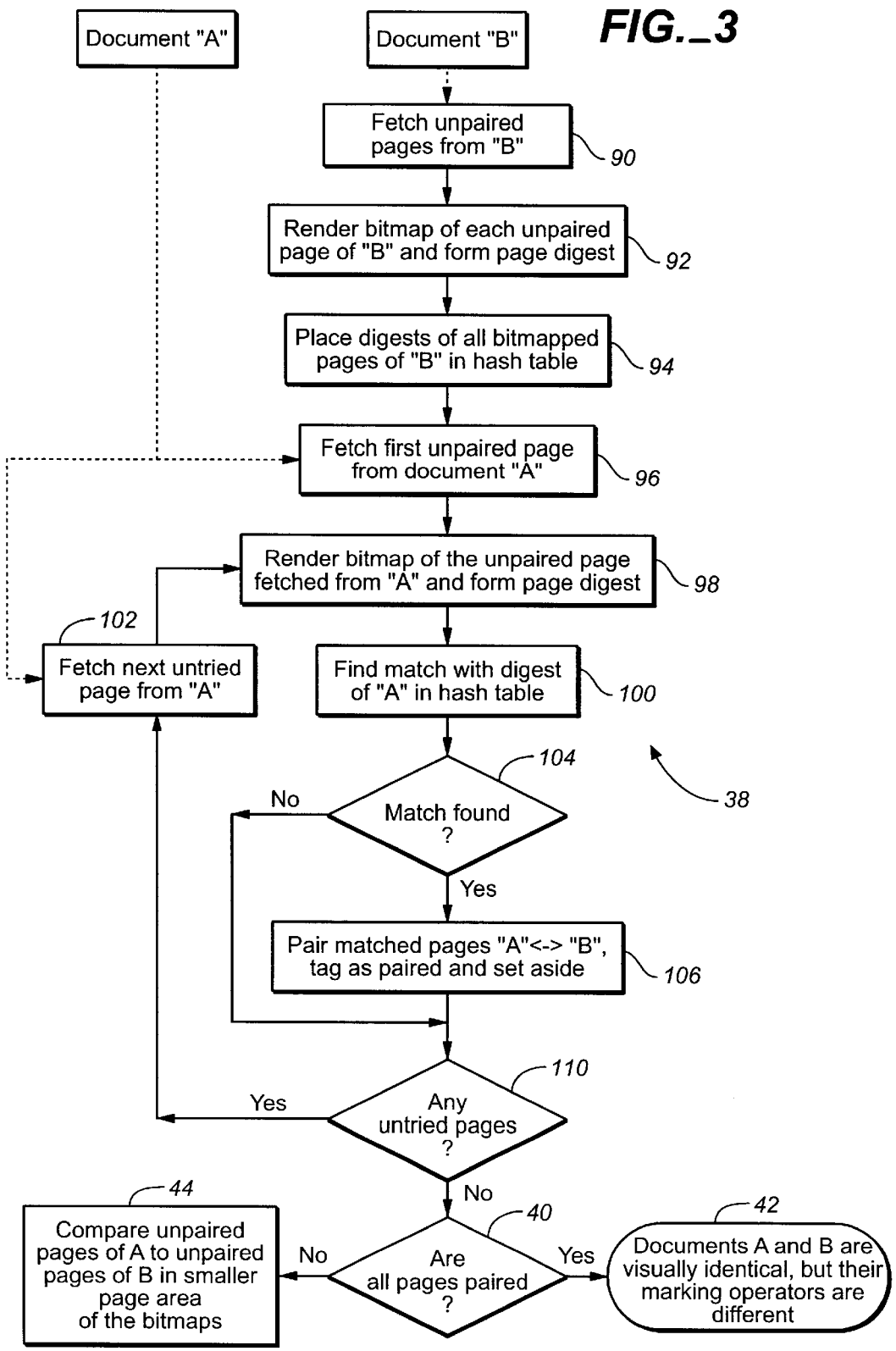
FIG._3

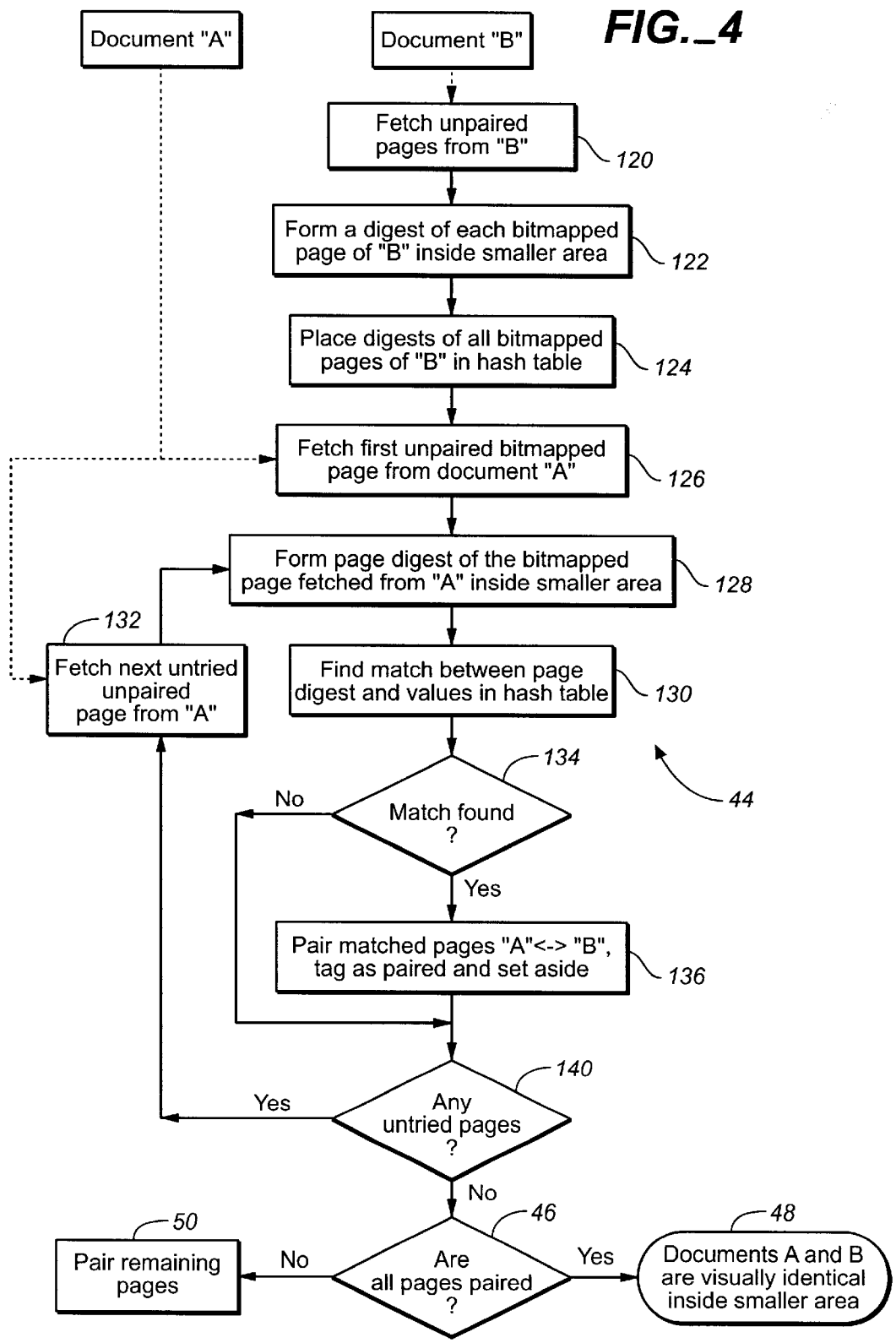

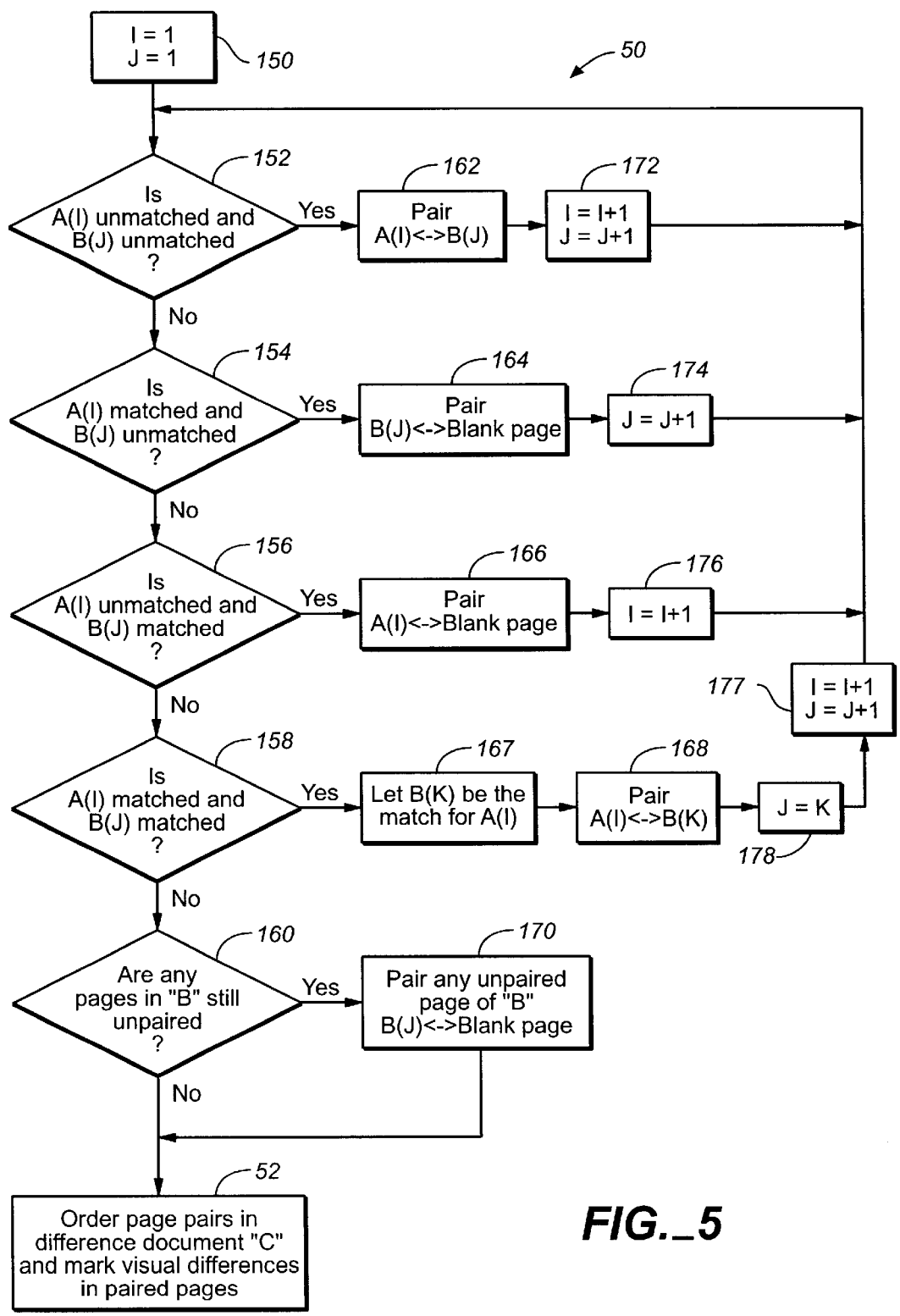
FIG._5

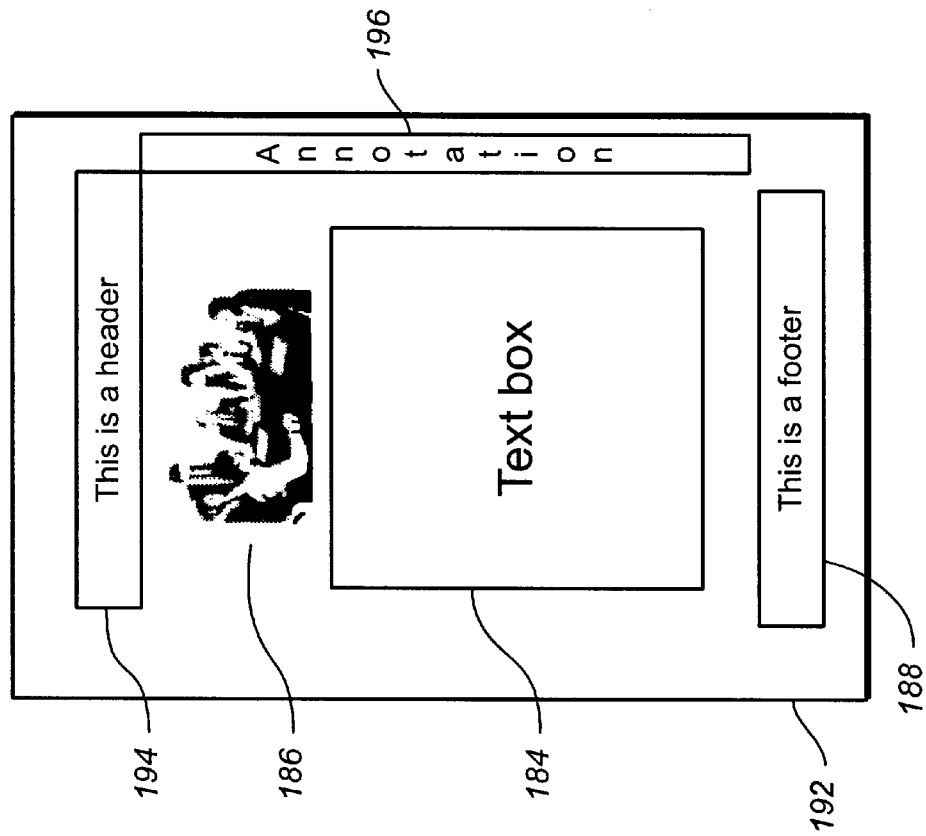
FIG._6B
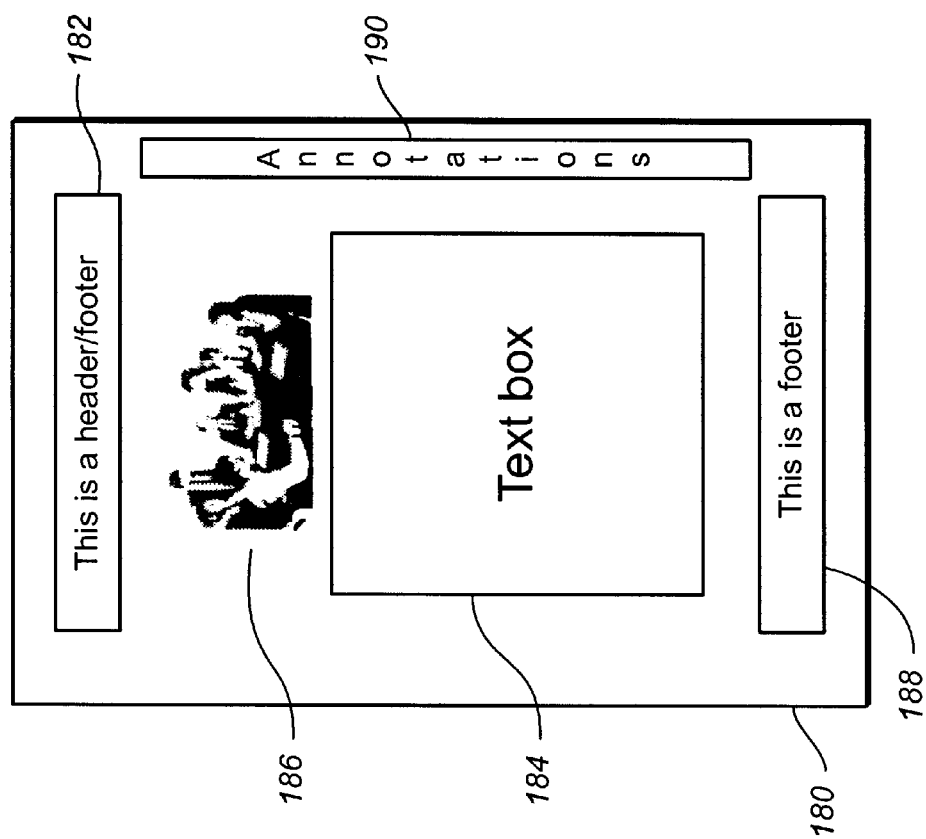
FIG._6A

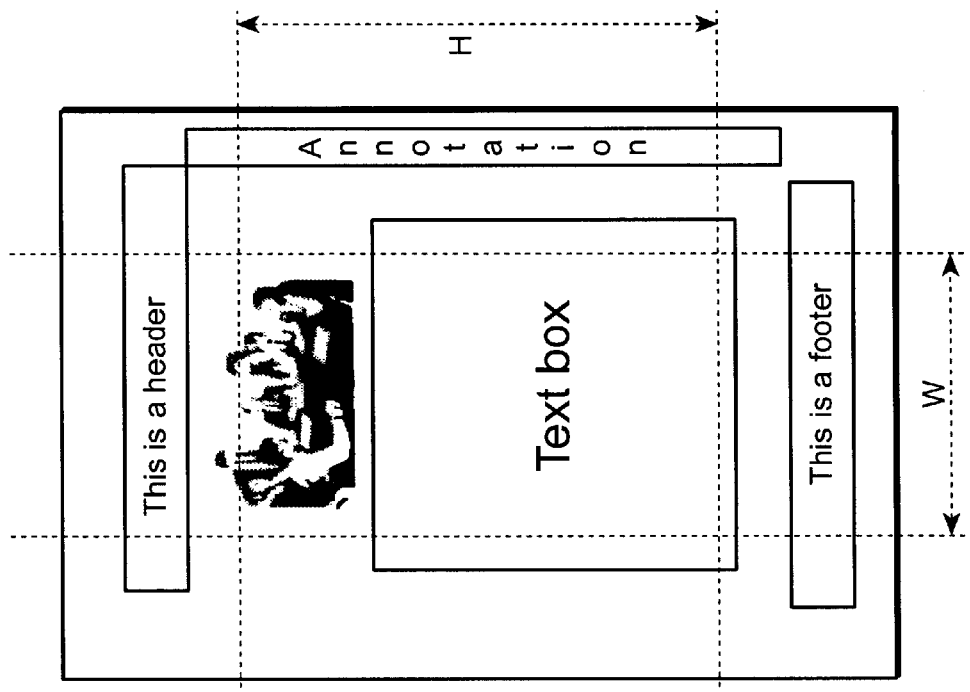
*FIG._6D*
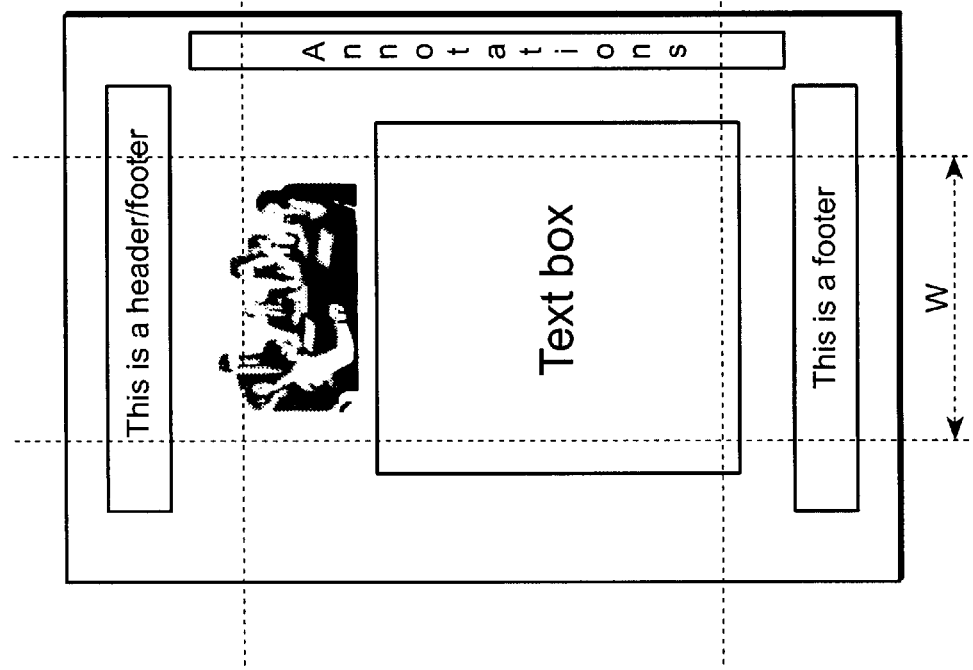
*FIG._6C*

PAGE ORGANIZATION IN DOCUMENT C
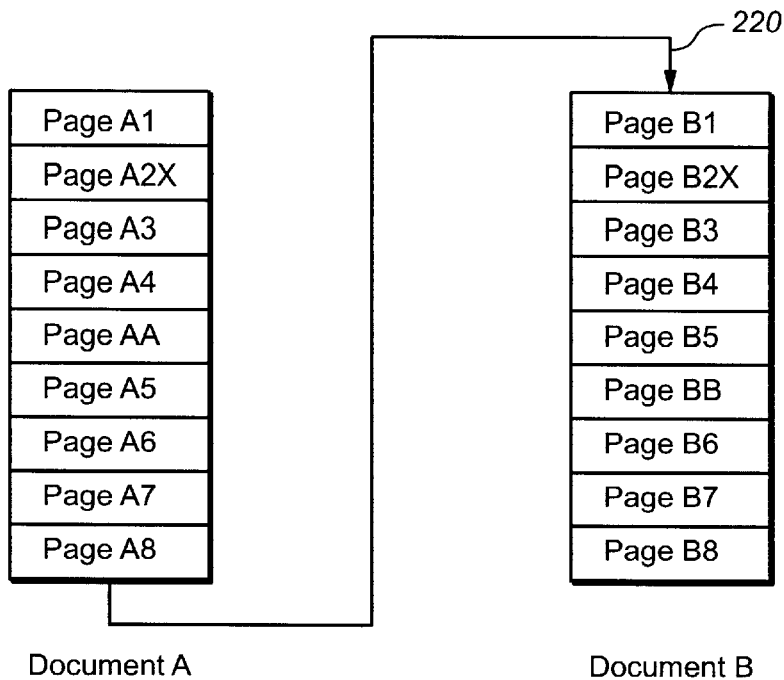
FIG._7A
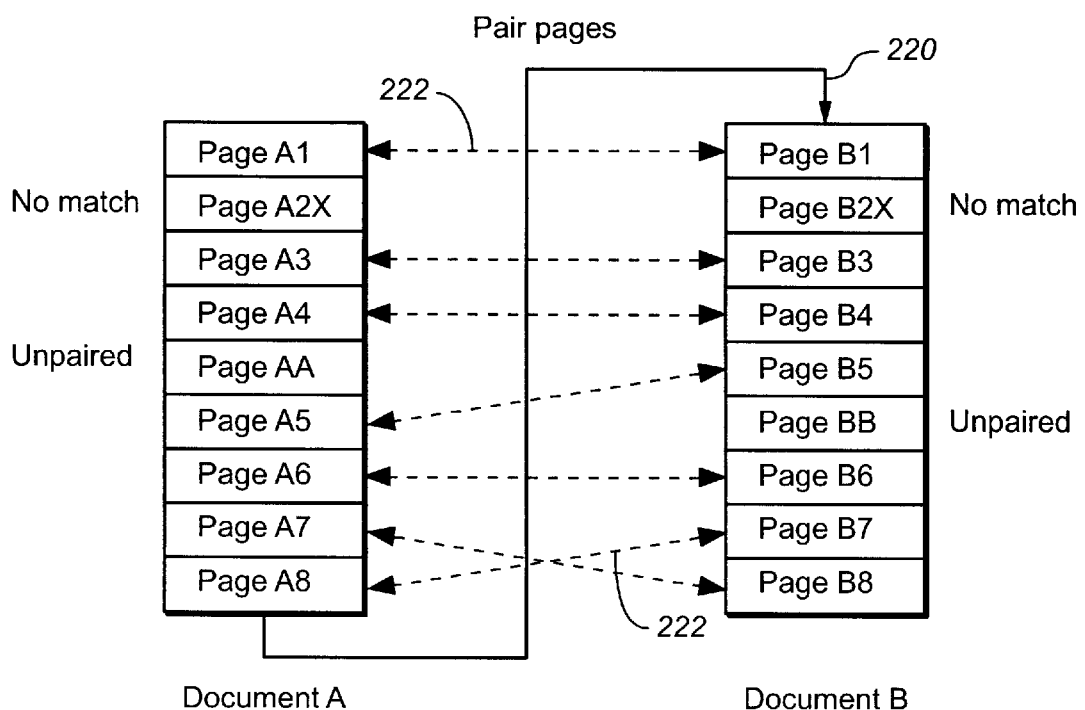
FIG._7B

FIG._7C
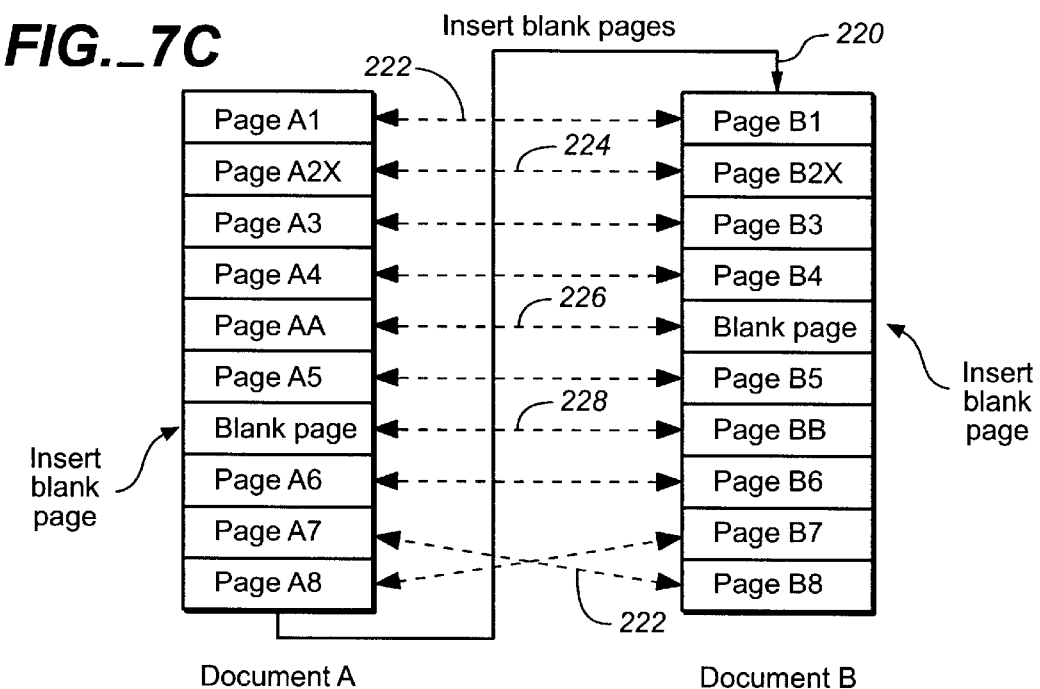
FIG._7D
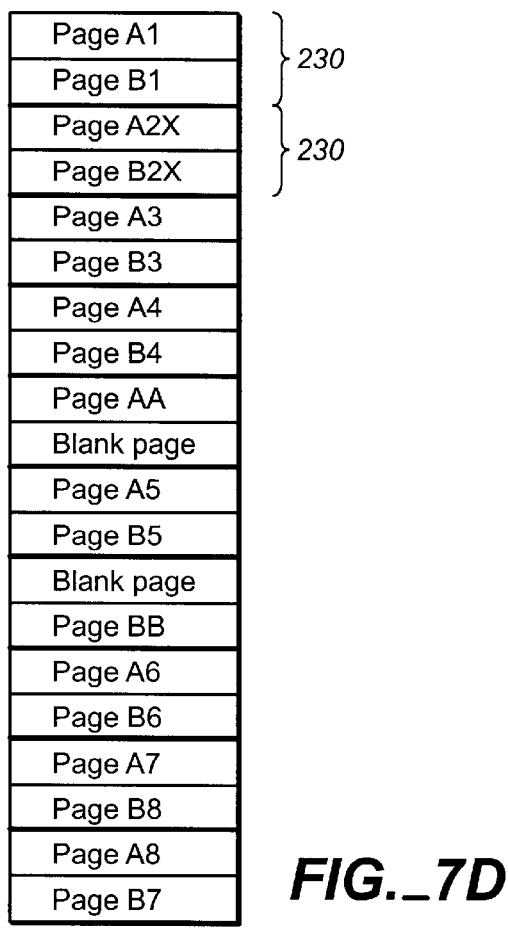

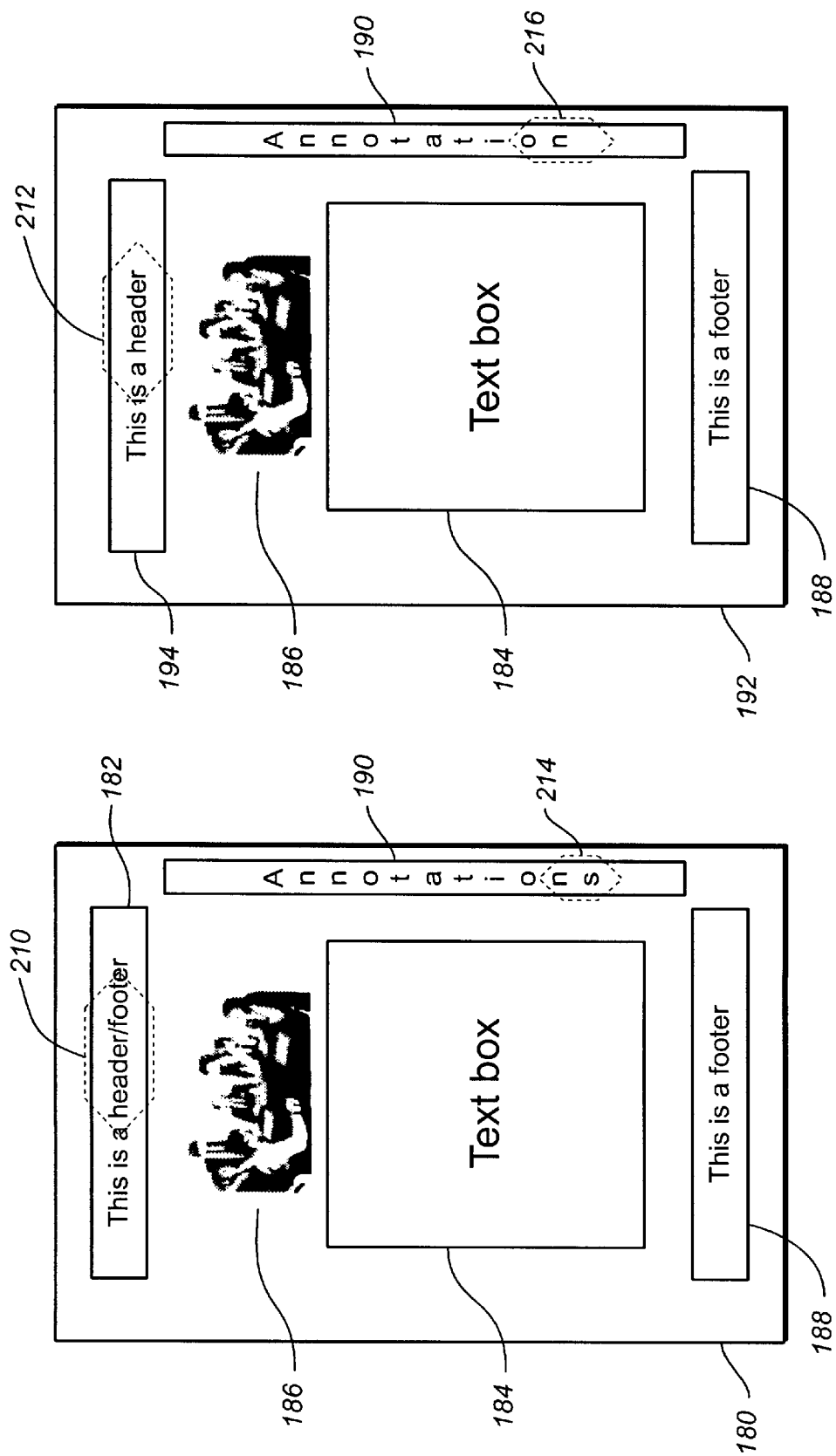

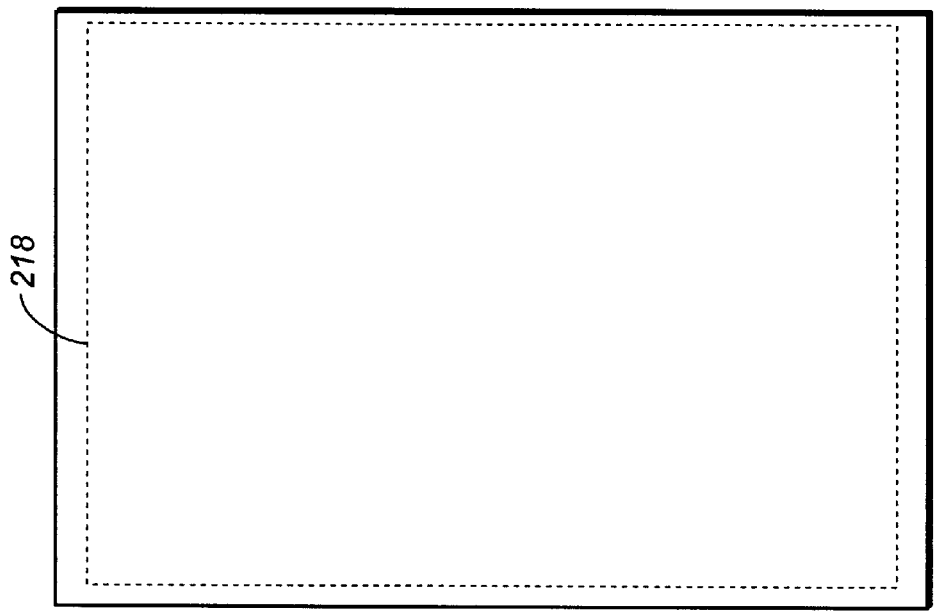
FIG._8D
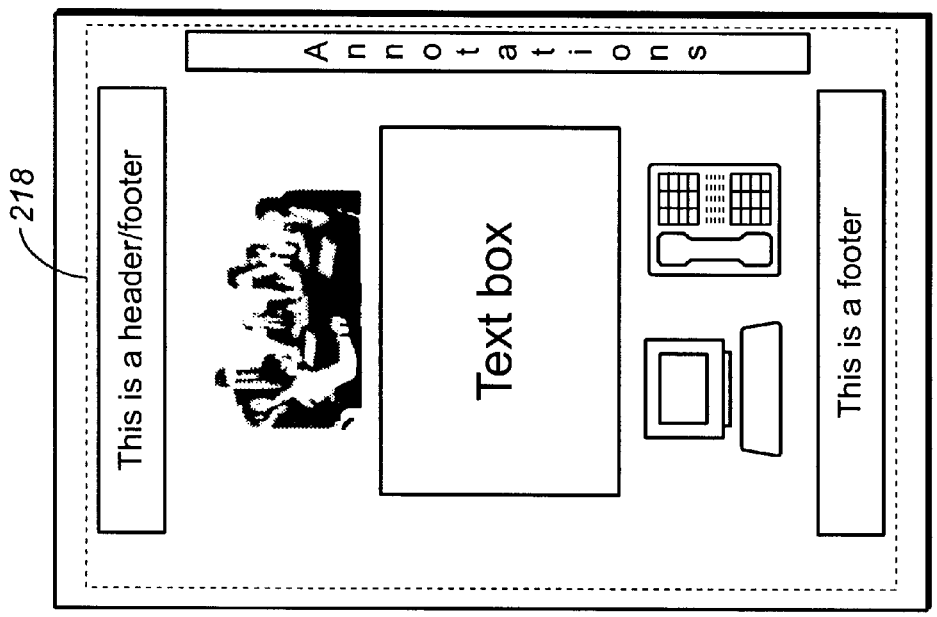
FIG._8C

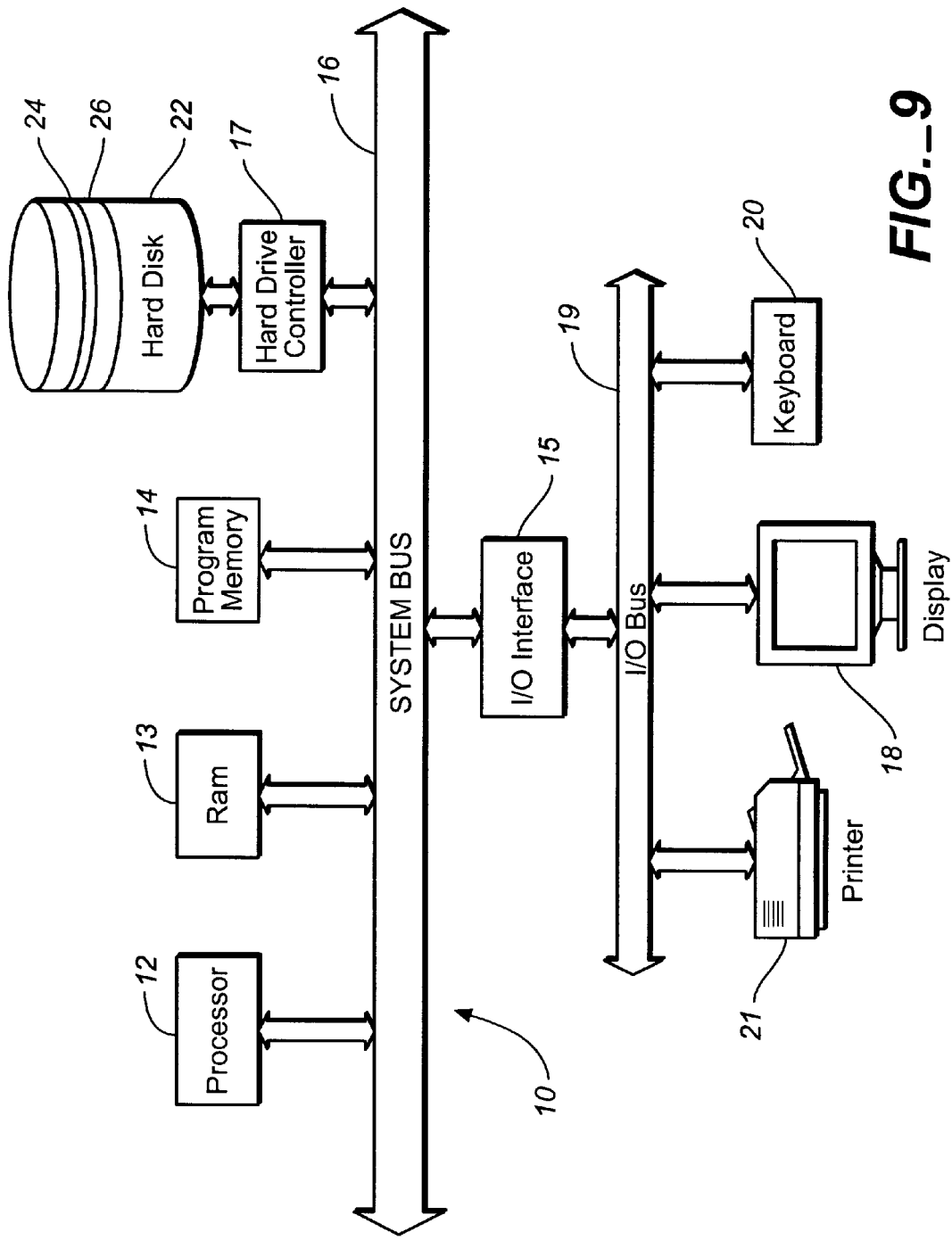
FIG._9

COMPARING CONTENTS OF ELECTRONIC DOCUMENTS

BACKGROUND

The invention relates to techniques to compare electronic documents.

Some computer application programs can compare two files based on the alphanumeric text contents. Applications that compare program source code generally compare two text files line-by-line. Only the text is analyzed whereas other file aspects, such as formatting, are ignored. Conventional word processing applications also compare different files or different versions of a file based only on their text contents.

Word processing applications increasingly produce content-rich files that integrate with text various objects, such as images, graphics, layout, color spaces, annotations, and so on. When such files are compared with the editing tools of the application programs, differences between the integrated objects are not detected, although such differences affect the appearance of a page on a display screen or on a printed page.

SUMMARY

In general, the process of the invention compares and matches two documents page by page. Each page has objects, such as text, graphics, images, color spaces, annotations, and so on. One example for documents of this type are Portable Document Format (PDF) files from Adobe Systems, Inc. PDF files are arranged as a sequence of individual pages. Each page has objects, such as text, graphics, images, color spaces, annotations, and so on. Such files cannot be compared with conventional text-based document compare routines.

According to an aspect of the invention, a method executed in a computer system includes comparing pages of a first document to pages of a second document page by page.

According to a further aspect of the invention, a method executed in a computer system for comparing electronic documents on a page-by-page basis includes storing in a hash table a hash value of page attributes of a first document and using the hash value of a page of the second document to determine whether there is a match of the hash value in the hash table. The method also includes pairing the page of the second document with the page of the first document that has the hash value in the hash table.

According to a further aspect of the invention, a computer program product for comparing electronic documents, residing on a computer-readable medium includes instructions for causing a computer to store in a hash table a hash value of page attributes of a first document. The program includes instructions to form hash values of page attributes of a second document and use the hash value of a page of the second document to determine whether there is a match of the hash value in the hash table. The program further includes instructions to pair the page of the second document with the page of the first document that has the hash value in the hash table.

According to a still further aspect of the invention, a method executed in a computer system for comparing electronic documents on a page-by-page basis, includes computing a first digest of marking operators of each page of a first and a second document and pairing the pages of the first document with the pages of the second document that have identical first digests. The method also includes computing a second digest of a rendered bitmap of each page of the first document that is still unpaired, and of each page of the second document, that is still unpaired and pairing the still unpaired of the first document with the still unpaired pages of the second document that have identical second digests. The method also includes computing a third digest of a subset of the rendered bitmap of each page of the first document that is still unpaired, and of each page of the second document that is still unpaired, and pairing the still unpaired pages of the first document with the still unpaired pages of the second document that have identical third digests and pairing an unpaired page in the first document which immediately follows a paired page in the first document, with the page in the second document which immediately follows the other of the paired pages in the second document, if the page which immediately follows the other of the paired pages in the second document is also still unpaired. The method also includes pairing any still unpaired pages in the first and second document with a blank page inserted in the second and first document and highlighting differences between paired pages that do not have identical first digest, on a visual rendering of the paired pages.

One or more advantages can be provided by the invention. Documents that include objects such as graphical objects can be compared. Documents can be compared based on various visually perceptible characteristics. Documents with differences in their visually perceptible appearance can be checked and their differences highlighted. Documents can be compared page by page to identify differences in such objects, which objects can include text, graphics, images, color spaces, annotations, and so on. The invention can compare documents by computing a digest for each page of a first document and a second document and comparing digests of the pages of the first and second documents to determine matches between pages of the first and second documents. The invention can apply highlighting to identify differences between pages of the documents that do not match, on a visual rendering of the pages. The visual rendering of the pages can be on a display, printer, and so forth.

BRIEF DESCRIPTION OF THE DRAWING

FIG. 1 is a flow chart of a process for page-by-page comparison of two documents.

FIGS. 2 to 5 are flow charts showing details of the comparison process of FIG. 2.

FIGS. 6A to 6D are schematic illustrations of paired pages with visible differences.

FIGS. 7A to 7D diagrams showing page organization of the documents; and

FIGS. 8A to 8D are diagram showing examples of markings applied to paired pages.

FIG. 9 is a block diagram of a computer system.

DETAILED DESCRIPTION

Referring now to FIGS. 1, 6A to 6D, and FIG. 9, the compare program 24 compares the two documents, "A" and "B", on a page by page basis based on the printable contents the documents, "A" and "B". Whole pages are compared. The program can separate and compare different objects embedded in a page. The paired pages can be stored in a newly created "difference" document C. The organization of the pages in the document C will be discussed below.

The program 24 will be described with reference to a set of pages from a pair of documents. Page 180 of document "A" (FIG. 6A) contains a header 182, a text region 184, a graphic object 186, a footer 188 and annotations 190. Page 192 of document "B" (FIG. 6B) contains a header 194 and annotations 196 which are different from header 182 of document "A"; and a text region 184, a graphic object 186, a footer 188 which are identical to those of document "A". Pages 180 and 192 thus differ only with respect to their respective headers 182, 194 and annotations 190, 186.

Referring to FIG. 1, program 24 compares all pages of document "A" to all pages of document "B". The comparison is based on a page digest computed for each page of each of the documents. The pages are first compared 32 based on page digests computed from marking operators of the pages. The program 24 pairs and tags those pages which are found to have identical page digests. If all pages of document "A" can be paired 34 with pages of document "B" based on identical digests and no unpaired pages remain, then the two documents are identical documents 36 and the process terminates 53.

If unpaired pages remain, then the unpaired pages of "A" are compared 38 to the unpaired pages of "B" using a different criterion, such as comparing bitmaps rendered from the pages. If the pages are found to have identical bitmaps 40, then the two documents are visually identical (i.e., the differences are indiscernible when the documents are printed) and the process goes via 42 to 52 where the pages in difference document "C" are ordered and the visual differences are marked. The visually identical pages are tagged. The process subsequently compares 44 the still unpaired pages of "A" to still unpaired pages of "B" over a subset of the bitmap, e.g. in a smaller page area, with the same size and location on the pages of "A" and "B". The smaller area selected on respective pages has the width W and the height H, as indicated in FIGS. 6C and 6D.

If the pages in 46 are found to be identical within the smaller area, then the respective pages of the two documents are paired and the process goes via 48 to 52 where the pages in difference document "C" are ordered and the visual differences are marked. If there are still unpaired pages remaining 46, then any still unpaired page, e.g. a page of "A", is considered to have no match and is either paired with another still unpaired page of "B" (if both unpaired pages of "A" and "B" immediately follow a page pair) or a corresponding blank page is inserted into "C". The visual differences are marked 52 on the paired pages and the process terminates 53.

Referring now to FIG. 2, the compare process 32 (FIG. 1) fetches in 60 pages from "B" and a page digest is produced 62 for every page of "B". The page digest is built up from digests of individual marking operators of the page. Marking operators are commands in page description language that describe a page. Such marking operators are described, for example, in the Portable Document Format (PDF) Reference Manual, Addison Wesley, 1993.

If the marking operator is a scalar (direct or indirect), its digest is a hash of the object type and object value, including all the bytes of an object value that is a string. If the object is an array, its digest is a hash of the array type and length and all the array elements. If the object is a dictionary, the digest is a hash of the dictionary type and its contents. If the object is a stream, its digest is a hash of the stream contents and the stream dictionary.

Dictionary contents are hashed by enumerating all the keys, sorting them, then incorporating the key-value pairs in sorted order. This makes the digest stable even if the order of the key enumeration varies between the two documents.

If a stream is filtered and/or encrypted, then reading the stream unfilters and decrypts. The Length, Filter, and FilterParams entries in the dictionary are ignored, so that the same stream contents can be compressed in different ways in the two files and still have equal digests.

Arrays, dictionaries, and streams often contain indirect references to other objects, and these references can form loops. A simple recursive walk will loop forever. Such a loop can be prevented by keeping a hash table of all indirect non-scalar objects encountered on a page, along with the exact order of encounter. If an object is encountered a second or subsequent time, a pair "duplicate object, order of encounter" is added to the digest and the recursion terminates. Thus, each object on a page is visited just once. Hash tables thus keep the processing time linear with respect to the size of the page. The hash table is cleared at the beginning of each page, so the page digest is not affected by the order in which pages are visited.

File object numbers and generations need not be included in the digest calculation, so that the digest of a page need not be affected by optimizing one of the files being compared. Optionally they can be included.

The process ignores all page attributes that do not affect the appearance of the printed page, but such ignored attributes can be included if desired.

The digests can be computed, for example, using a modified 32-bit cyclic redundancy check (CRC32) calculation. New 32-bit values are XORed directly into a running 32-bit digest. The result is shifted to the left by 1 bit and the bit which is shifted out to the left, is XORed back in according to the CRC32 polynomial. The resulting digest is very fast and sufficiently secure. Alternatively, a full 128-bit hash function, such as MD5, can be used. This would, however, be significantly slower.

The page digest that is computed from the marking operators, is placed 64 in a hash table. Subsequently, pages from document "A" are sequentially fetched 66 and a page digest of the marking operators for each sequentially fetched page of document "A" is formed 68 and looked up in the hash table 70. If the page digest value of "A" matches a value of the hash table 74, then the page of document "A" is identical to the page of document "B" that has the corresponding digest value in the hash table. If multiple pages of one document have the same digest value (such as, for example, two completely blank pages in each document), then the first encountered page is matched first and subsequent pages are matched in order. Matching pages are paired, tagged and set aside in the difference document "C", as illustrated in FIG. 7D.

The check process 80 checks if all pages have been tried for a match. If all pages have been tried 80, then checks 34 if all pages have been found to match. If not all pages of "A" have been tried, a next page is fetched 72 from "A" and the page digest of that page is formed 68.

If all pages are paired 36, then document "A" is identical to document "B" and the program 24 is complete and terminates 53. Otherwise, the program 24 branches to 38 to compare unpaired pages of document "A" to unpaired pages of "B" using rendered bitmaps.

Referring now to FIG. 3, compare process 38 (FIG. 1) fetches 90 unpaired pages from "B" and each unpaired page is rendered 92 as an off-screen bitmap at a predetermined resolution. The resolution of the bitmap page is selected to be sufficient to resolve differences that are noticeable on the printed page while providing acceptable computational performance. The bitmap used in the present example has a fairly low resolution of 36 DPI and 16-bit RGB color. With this resolution, subtle one-letter changes in 4-point Times-Roman text ("e" to "c" and "I" to "i") are reliably detected. Some one-letter changes are detected in 1.5-point type. Full-word changes are detected in 0.25-point type.

The bitmaps are used to compute 92 page digests using, for example, the same modified CRC32 calculation described above. The page digests are placed 94 in a hash table.

Then unpaired pages from document "A" are sequentially fetched 96. A bitmap is rendered 98 and the page digest of the bitmap page of "A" is formed 98 and looked up 100 in the hash table. If the bitmap page digest value of "A" matches 104 a bitmap value of the hash table 94, then the page of document "A" is visually identical to, i.e., has the same printable contents as, the corresponding page of document "B" which has the same digest value. The two matching pages are paired, tagged and set aside in difference document "C".

The process 38 checks 110 if all pages have been tried for a match. If all pages have been tried, then the process 38 checks 40 if all pages are paired. If not all pages of "A" have been tried, then checking 110 goes to fetch 102 a new untried page from "A", a bitmap is rendered 98, and the process repeats.

If all pages match 40 and are paired, then document "A" is visually identical to document "B" and the compare process 38 is complete and terminates 42. Pages that are visually identical, but have different marking operators, will be marked with a visually distinct border around the entire page, as will be discussed below. If not all pages are paired 40, then the process goes to 44 to compare unpaired pages of "A" to unpaired pages of "B" in a smaller, but identical page area of the respective bitmaps.

Referring now to FIG. 4, process 44, fetches 120 still unpaired pages from "B". A smaller area on each page of "B" is selected for comparison. As illustrated in FIGS. 6C and 6D, this smaller area is advantageously, but not necessarily, located near the center of the page. This process often pairs up pages that are identical except for running page numbers or dates or, as in the present example, header/footer text and annotations, respectively.

A page digest of the bitmap which corresponds to that smaller page area is formed 122 for every page of "B" and placed 94 in a hash table. Then unpaired pages from document "A" are sequentially fetched 126 and a page digest of the same smaller page area of the rendered bitmap of a page of document "A" is formed 128 and looked up 130 in the hash table. If the page digest value of "A" matches 134 a value of the hash table, then the page of document "A" is visually identical to the corresponding page of document "B" with the same digest value, except for the page area which lies outside the smaller area which was used to compute the page digest. The two matching pages are paired, tagged and set aside in difference document "C".

The process 44 checks 140 if all pages have been tried for a match. If all pages have been tried 140, the process 44 checks 46 if all pages are paired. If not all pages of "A" have been tried 140, then the process 44 fetches 132 a new untried page from "A" and the page digest of the corresponding smaller page area is again formed 128.

The page organization of the starting documents "A" and "B" and of the final difference document "C" is illustrated in FIGS. 7A to 7D. The initial difference document "C" is created by arranging in a sequential order first all pages form "A" and then all pages from "B", as indicated in FIGS. 7A to 7C by the arrow 220. At this point in the process, some of the pages (A1, A3, A4, A5, A6, A7 and A8) of document "A" are each paired with a corresponding page (B1, B3, . . . , B6, B8, B7) of document "B", as indicated by the arrows 222. Pages of document "A" (pages A2X, AA) and of document "B" (pages B2X, BB) still remain which have no match.

Referring now also to FIG. 5, the process 50 now pairs the remaining unpaired pages of document "A" in ascending order with either a still unpaired page of document "B" or with a blank page. Any remaining unpaired page of document "B" is also paired with a blank page. All pages of document "A" and of document "B" are now paired (FIG. 7C). The paired pages 228 are arranged sequentially in difference document "C" (FIG. 7D) and can be displayed side-by-side on monitor 18.

Process 50 (FIG. 5) visits the pages of document "A" in ascending order, starting 150 with the first page I=1 and the first page J=1 of document "B". If the page A(I) of "A" is unpaired and the page B(J) of "B" is also unpaired, then these pages are paired 162 although their respective digests do not match. FIG. 7B illustrates this situation with the pages A2X and B2X, respectively, and by the arrow 224 in FIG. 7C. Although A2X and B2X do not match, they are paired under the assumption that it is rather unlikely that two unpaired pages (A2X, B2X) immediately follow two paired pages (A1, B1). Step 152 then increments I and J each by 1 and the next pages A(I+1) and B(J+1) are fetched.

Otherwise, the next step 154 checks if page A(I) is paired. Paired pages can be quickly found because they are tagged, as described above. If page A(I) is paired and page B(J) is not paired, corresponding to the pages A5 and BB of FIG. 7B, then B(J) is paired 164 with a blank page inserted into document "A" (arrow 226 in FIG. 7C) and step 174 increments J by 1. The process then goes to 154, fetching the next pages.

Otherwise, the next step 156 checks if page B(J) is paired. If page B(J) is paired and page A(I) is not paired, corresponding to the pages AA and B5 of FIG. 7B, then A(I) is paired 166 with a blank page inserted into document "B" (arrow 228 in FIG. 7C) and step 176 increments I by 1. The process then goes to 154, fetching the next pages.

Otherwise, the next step 158 checks if page A(I) and page B(J) are each matched. For example, A(I) can be matched 167 with B(K) which FIG. 7B shows in the form of pages A7 and B8. A(I) is then paired 168 with the respective B(K). The counter for J then resets 178 J=K to account for the changed page order in "B", as indicated by the crossed arrows 222 in FIG. 7C. Step 177 then increments both I and J by 1 and the next pages are fetched in 152.

Otherwise, the next step 158 checks if any unpaired pages remain in document "B". Any unpaired pages in document "B" are then paired with blank pages inserted into document "A".

All pages of both documents are now paired. The process 50 goes to 52 to sequentially arrange the page pairs in the difference document "C", as shown in FIG. 7D, and to mark the visual differences in the paired pages 230 (FIG. 7D). If the difference document "C" is formed of all paired pages that have identical marking operators (32 in FIG. 1), then "C" has at least as many pages as "A" and "B" combined, taking into account page insertions and deletions. Document "C" retains the original page sequence (except for the insertion of blank pages) of one of the two source documents "A" and "B".

Alternatively, a difference document "C'" is formed of only those page pairs that are different according to the criteria applied in processes 38 and 42 of FIG. 1. Typically, "C'" contains a significantly smaller number of pages than "C". This is also indicated in FIG. 8D. For example, if a 200-page document pair "A" and "B" has only three pages that are visually different, the difference document "C'" would only contain six pages. The paired pages of document "C" which are not identical, i.e., pages which differ in their marking operators, are marked with visible markings to alert the viewer. The following situations can occur:

Page pairs have identical marking operators and are not marked. The marking operator digests of page pairs are different, but the rendered bitmaps are identical. The pages are then not exactly identical, but still visually identical. A single box is then drawn around the entire page. A single box is also drawn around the entire page where that page is paired with a blank page. This is shown in FIGS. 8C and 8D as box 218.

Page pairs differ with respect to the rendered bitmap of the entire page, but match when the bitmaps are compared for a smaller page area. A difference bitmap is produced (by an XOR operation) of the entire page area of the page pair. A marker process then scans the difference bitmap for non-zero values and calculates an outline of a suitable geometrical shape, such as a rectangle or a hexagon, that surround clusters of the non-zero values. The outline around a single difference pixel is expanded until only identical pixels are found within a predetermined margin. Additional hexagons are started around other difference pixels. If too many hexagons are produced on a page, then the margin is increased to a larger value to limit the number of hexagons.

FIGS. 8A and 8B show the pages 7A and 7B, respectively, after the printable differences are marked 52. As mentioned above, the FIGS. 6A and 6B differ only with respect to the respective headers 182, 194 and annotations 190, 196. A hexagon 210 is drawn around the different text in header 182 of page 180, and a corresponding hexagon 212 is drawn around the different text in header 194 of page 192. Likewise, hexagons 214, 216 are drawn around the different text in annotations 190, 196, respectively. If another difference is detected, then another outline is produced around another difference pixel (not shown). If too many outlines are produced on a page, then the margin is increased to a larger value to limit the number of outlines so as to produce clearly discernible markings. The hexagons are preferably rendered in a contrasting color so as to stand out easily on the screen as well as on black-and-white printed pages.

After all pages are paired and the differences between paired pages are marked 52, the comparison is complete and the process terminates 53 (FIG. 1).

The process for comparing and matching two documents has been described for PDF files. The process, however, can also be used with other documents based on a page description language, such as PostScript® (Adobe Systems Inc.), HTML, SQML, XML, with includes objects other than simply lines of text as well as plain text documents or plain text documents having embedded graphical contents.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output.

The invention can advantageously be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

An example of one such type of computer is shown in FIG. 9, which shows a block diagram of a programmable processing system 10 suitable for implementing or performing the apparatus or methods of the invention. The system 10 includes a processor 12, a random access memory (RAM) 13, a program memory 14 (for example, a writable read-only memory (ROM) such as a flash ROM), a hard drive controller 17, and an input/output (I/O) controller 15 coupled by a processor (CPU) bus 16. The system 10 can be preprogrammed, in ROM, for example, or it can be programmed (and reprogrammed) by loading a program from another source (for example, from a floppy disk, a CD-ROM, or another computer).

The hard drive controller 17 is coupled to a hard disk 22 suitable for storing executable computer programs 24, including programs embodying the present invention, and data files, including the documents to be compared.

Also coupled to the I/O bus 19 is a display 18, a keyboard 20, and a printer 21. Alternatively, separate connections and/or separate buses can be used for the I/O interface 15, display 18 and keyboard 20.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method executed in a computer system for comparing electronic documents on a page-by-page basis, the method comprising:

storing in a hash table a hash value of page attributes of a first document;

using the hash value of a page of the second document to determine whether there is a match of the hash value in the hash table;

pairing the page of the second document with the page of the first document that has the hash value in the hash table;

rendering a bitmap of each of the still unpaired pages of the first and second documents;

storing in a hash table a hash value of the bitmap of each of the still unpaired pages of the first document;

forming hash values of the bitmap of each of the unpaired pages of the second document;

pairing the page of the second document with the page of the first document that has the hash value of the bitmap in the hash table;

storing in a hash table a hash value of a subset of the bitmap of each of the still unpaired pages of the first document;

forming hash values of a subset of the bitmap of each of the still unpaired pages of the second document;

pairing the page of the second document with the page of the first document that has the has value of the subset of the bitmap in the hash table;

pairing a still unpaired page in the first document which immediately follows one page of a page pair, with a still unpaired page in the second document which immediately follows the other page of the page pair;

pairing a still unpaired page in one document with a blank page in the other document if the unpaired page in the one document immediately following one page of a page pair and if the page in the other document which immediately follows the other page of the page pair is paired; and highlighting differences between the pages that do not match, on a visual rendering of the pages.

2. A computer program product for comparing electronic documents, the product residing on a computer-readable medium and comprising instructions for causing a computer to:

store in a hash table a hash value of page attributes of a first document, wherein the page attribute is computed of marking operators of a page;

form hash values of page attributes of a second document;

use the hash value of a page of the second document to determine whether there is a match of the hash value in the hash table;

pair the page of the second document with a page of the first document that has the hash value in the hash table;

render a bitmap of the still unpaired pages:

store in the hash table a hash of the bitmap of each of the still unpaired pages of the first document;

form bitmaps of a selected portion of each of the pages;

store in a hash table of page attributes the hash of the bitmap of the selected portion the page for each of the unmatched pages of the first document;

use hash value of page attributes of the bitmap of the selected portion the page of the second document to determine if the hash value of a page of the second document matches a hash value in the hash table; and pair a still unpaired page in the first document that immediately follows one page of a page pair, with a still unpaired page in the second document that immediately follows the other page of the page pair.

3. A method executed in a computer system for comparing electronic documents on a page-by-page basis, the method comprising:

computing a first digest of marking operators of each page of a first and a second document and pairing the pages of the first document with the pages of the second document that have identical first digests;

computing a second digest of a rendered bitmap of each page of the first document that is still unpaired, and of each page of the second document, that is still unpaired, and pairing the still unpaired of the first document with the still unpaired pages of the second document that have identical second digests;

computing a third digest of a subset of the rendered bitmap of each page of the first document that is still unpaired, and of each page of the second document that is still unpaired, and pairing the still unpaired pages of the first document with the still unpaired pages of the second document that have identical third digests;

pairing an unpaired page in the first document which immediately follows a paired page in the first document, with the page in the second document which immediately follows the other of the paired pages in the second document, if the page which immediately follows the other of the paired pages in the second document is also still unpaired;

pairing any still unpaired pages in the first and second document with a blank page inserted in the second and first document; and highlighting differences between paired pages that do not have identical first digest, on a visual rendering of the paired pages.

4. A method executed in a computer system for comparing electronic documents on a page-by-page basis, the method comprising:

computing a first digest of marking operators of each page of a first and a second document and pairing the pages of the first document with the pages of the second document that have identical first digests:

computing a second digest of a rendered bitmap of each page of the first document that is still unpaired, and of each page of the second document, that is still unpaired, and pairing the still unpaired of the first document with the still unpaired pages of the second document that have identical second digests;

computing a third digest of a subset of the rendered bitmap of each page of the first document that is still unpaired, and of each page of the second document that is still unpaired, and pairing the still unpaired pages of the first document with the still unpaired pages of the second document that have identical third digests;

pairing an unpaired page in the first document which immediately follows a paired page in the first document, with the page in the second document which immediately follows the other of the paired pages in the second document, if the page which immediately follows the other of the paired pages in the second document is also still unpaired;

pairing any still unpaired pages in the first and second document with a blank page inserted in the second and first document; and highlighting differences between paired pages that do not have identical first digest, on a visual rendering of the paired pages; and arranging the paired pages in a difference document based on an original page sequence in one of the documents.

5. A method executed in a computer system for comparing electronic documents on a page-by-page basis, the method comprising:

computing a first digest of marking operators of each page of a first and a second document and pairing the pages of the first document with the pages of the second document that have identical first digests;

computing a second digest of a rendered bitmap of each page of the first document that is still unpaired, and of each page of the second document, that is still unpaired, and pairing the still unpaired of the first document with the still unpaired pages of the second document that have identical second digests;

computing a third digest of a subset of the rendered bitmap of each page of the first document that is still unpaired, and of each page of the second document that is still unpaired, and pairing the still unpaired pages of the first document with the still unpaired pages of the second document that have identical third digests;

pairing an unpaired page in the first document which immediately follows a paired page in the first document, with the page in the second document which immediately follows the other of the paired pages in the second document, if the page which immediately follows the other of the paired pages in the second document is also still unpaired;

pairing any still unpaired pages in the first and second document with a blank page inserted in the second and first document; and highlighting differences between paired pages that do not have identical first digest, on a visual rendering of the paired pages; and arranging in a difference document paired pages that differ from each other with respect to at least one of the first, second and third digests.

* * * * *

UNITED STATES PATENT AND TRADEMARK OFFICE
CERTIFICATE OF CORRECTION

PATENT NO. : 6,324,555 B1  Page 1 of 1
DATED : November 27, 2001
INVENTOR(S) : Richard L. Sites It is certified that error appears in the above-identified patent and that said Letters Patent is hereby corrected as shown below:

Title page,
Item [54], Title, after "COMPARING CONTENTS OF ELECTRONIC DOCUMENTS", please insert -- PAGE-BY-PAGE --.

Item [56], References Cited, U.S. PATENT DOCUMENTS, please delete "Rucklidgw et al.", and insert -- Rucklidge et al. --

Column 9,
Line 22, after "the first document that has the", please delete "has value" and insert -- hash value --.

Signed and Sealed this

Twenty-second Day of October, 2002

Attest:

Attesting Officer

JAMES E. ROGAN
Director of the United States Patent and Trademark Office